Jan. 5, 1960
G. K. HAUSE
2,919,608
TRANSMISSION
Filed Aug. 2, 1956
3 Sheets-Sheet 1
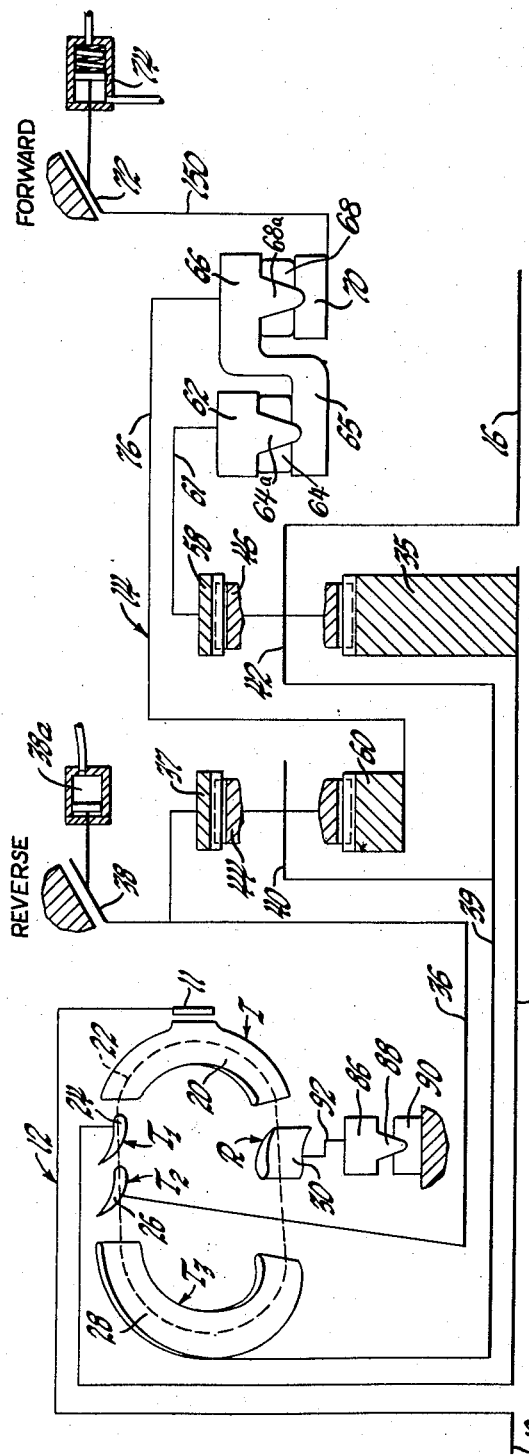
INVENTOR.
Gilbert K. Hause
BY
T. L. Chisholm
ATTORNEY

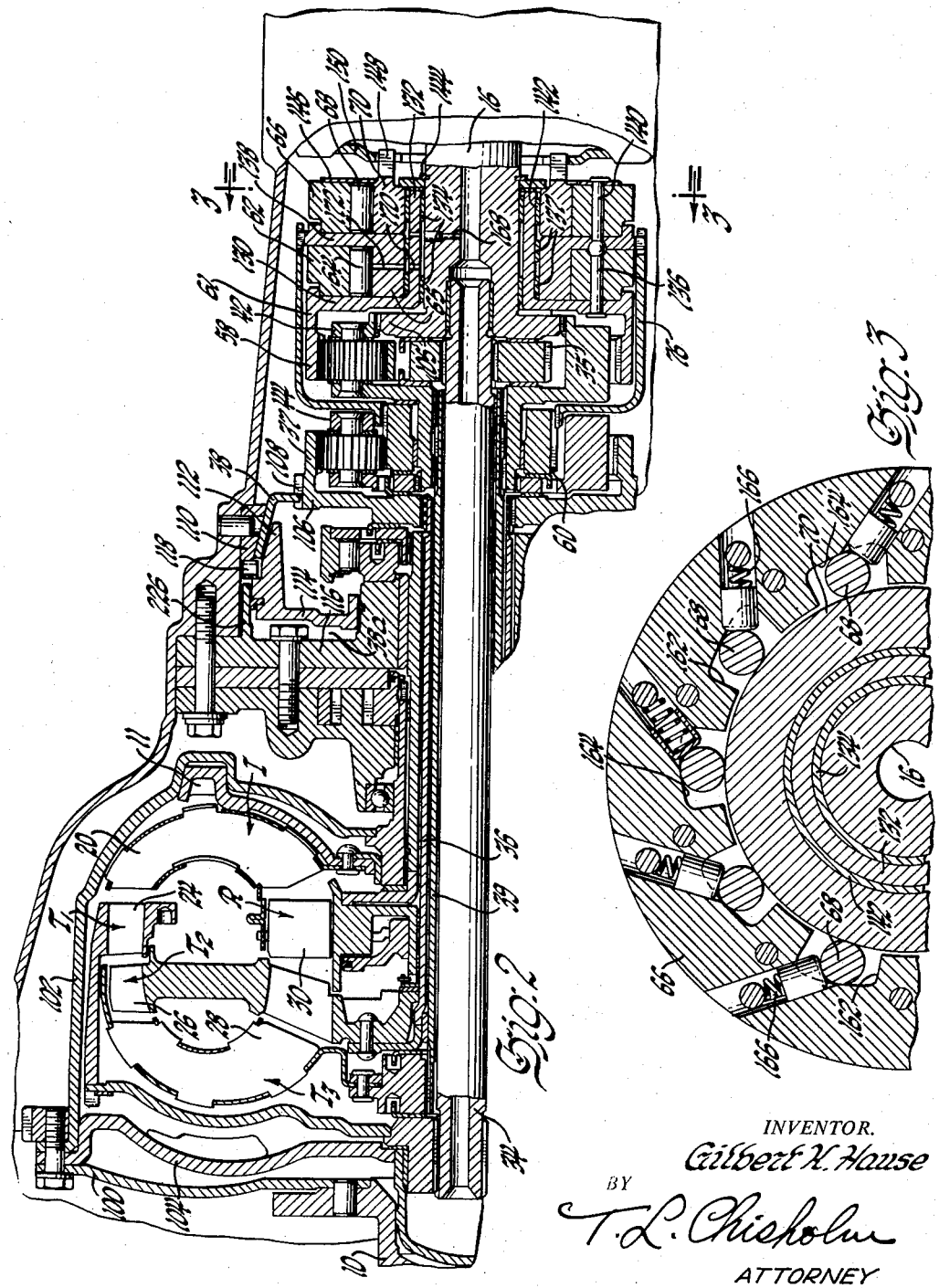

Jan. 5, 1960

G. K. HAUSE 2,919,608

TRANSMISSION

Filed Aug. 2, 1956

INVENTOR.
Gilbert K. Hause
BY
T. L. Chisholm
ATTORNEY

United States Patent Office 2,919,608
Patented Jan. 5, 1960

2,919,608

TRANSMISSION

Gilbert K. Hause, Franklin, Mich., assignor to General Motors Corporation, Detroit, Mich., a corporation of Delaware Application August 2, 1956, Serial No. 601,804

9 Claims. (Cl. 74—760)

This invention relates to transmissions in which a hydrodynamic torque converter drives gearing which drives an output shaft. The transmission may be driven by the engine of a car for propelling the car.

A transmission has been proposed in which a plurality of turbines drive an output shaft through a plurality of sets of gears. In general, the turbines successively pick up the load on starting and then successively are mechanically disconected from the power transmitting train as the individual turbines reach their terminal speeds. The successive connection and disconnection of the turbines and the load is effected through overrunning or one-way clutches. One example of such a transmission is disclosed in an application by Oliver K. Kelley for United States Patent Serial No. 537,472, filed September 29, 1955.

The present invention relates to improvements in the construction and arrangement of the one-way clutches used in the transmissions of the type disclosed in the Kelley application referred to. Among the objects of the invention are to provide an improved simple and economical construction of one-way clutches which can be readily assembled and easily disassembled for service and which is reliable and durable in operation.

Other objects and advantages of the invention will be apparent from the following description and accompanying drawings in which:

Fig. 1 is a diagrammatic representation of one-half of a symmetrical longitudinal section of a transmission embodying one form of my invention;

Fig. 2 is a fragmentary longitudinal section of a portion of the actual structure of a transmission embodying one form of my invention;

Fig. 3 is a section through the overrunning clutches on the line 3—3 of Fig. 2;

*General arrangement*

Figure 4:
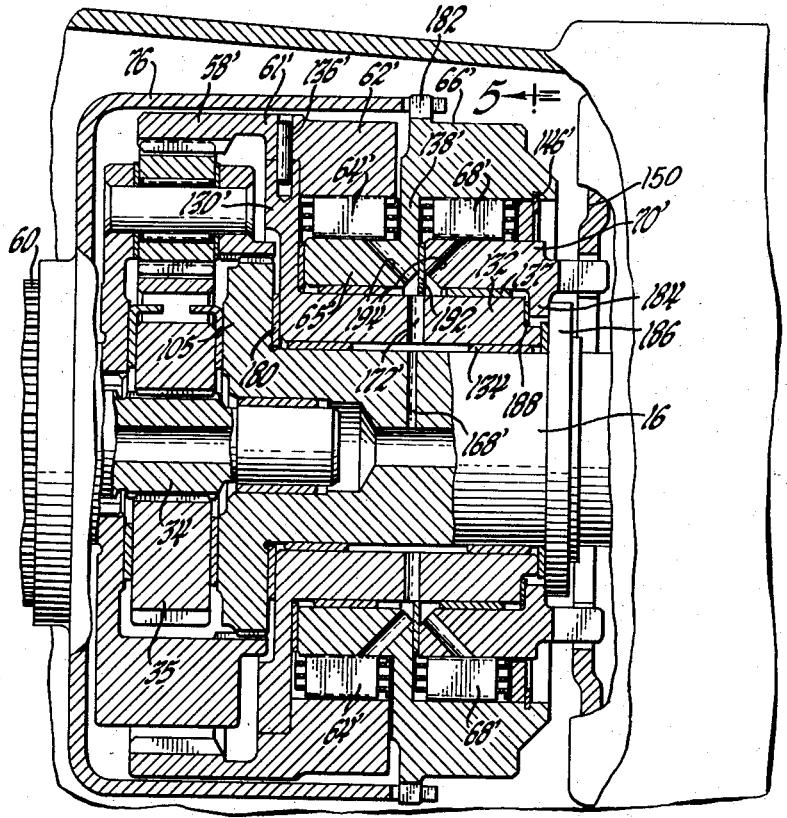
Fig. 4 is an enlarged fragmentary longitudinal section, taken as Fig. 2 is taken through a modified form of overrunning clutch arrangement.

Referring to Fig. 1, the transmission may be driven by an engine shaft 10 which can be connected by a neutral clutch 11 to a hydrodynamic torque converter generally designated by 12 which drives planetary reduction gearing generally designated by 14 connected to a final drive shaft 16. The torque converter includes an impeller I of generally known form represented diagrammatically in Fig. 1 by a single blade 20, rotated by the input shaft 10 when connected by the neutral clutch 11 and circulating working liquid in a closed toroidal path, the center line of which is represented by the dotted line 22 in Fig. 1.

A first turbine $T_1$ is represented in Fig. 1 by a single blade 24, a second turbine $T_2$ is represented by blade 26, a third turbine $T_3$ by blade 28 and a reaction member R by blade 30. The liquid from the pump I flows successively through $T_1$, $T_2$, $T_3$ and R, as is known.

The first turbine $T_1$ is connected by shaft 34 to drive a rear input sun gear 35 of the planetary gearing. The second turbine $T_2$ is connected by a shaft 36 to drive a front input ring gear 37 which can also be held fast by a reverse friction torque establishing device 38 whenever the friction torque establishing device is set by any suitable hydraulic cylinder 38a to effect reverse drive, as will be explained.

The third turbine $T_3$ is connected by shaft 39 to drive front and rear carriers 40 and 42, which respectively support front planetary pinions 44 meshing with the front input ring gear 37, and rear planetary pinions 46 which mesh with the rear input sun gear 35. The shaft 39 forms the principal drive shaft of the transmission and through the carrier 42 is connected to the final drive shaft 16. A reaction ring gear 58, meshing with planet pinions 46 completes the rear planetary unit of the reduction gear, and a reaction sun gear 60, meshing with the front planet pinions 44, completes the front planetary unit.

The rear reaction ring gear 58 is connected by a drum 61 to a one-way or over-running clutch or freewheeler having an outer race 62, one-way or unidirectional torque-establishing means represented by wedging or binding members such as rollers or sprags 64, and an inner race 65. In the diagrammatic illustration (Fig. 1) the point 64a points toward the direction in which the race 62 runs free. The inner race 65 is integral with an outer race 66 of a second similar one-way clutch rotatable toward the eye of the observer about an inner race 70 but prevented from rotating in the opposite sense with respect to race 70 by binding members 68. The point 68a indicates the direction in which the race 66 runs free on the race 70. The race 70 can be held fast by a friction torque establishing device 72 which can be set by a hydraulic cylinder 74. The races 66 and 65 are connected to the front sun reaction gear 60 by a drum 76.

*Operation of general arrangement*

The structure as so far described operates as follows:

Assume that the input shaft 10 is driven by the engine of an automobile whose propeller shaft is the final drive shaft 16, that the neutral clutch 11 is engaged, and that the car is at rest.

For forward drive the friction torque establishing device 72 is set, the reverse friction torque establishing device 38 being released. On starting, the inertia of the car holds the carriers 40 and 42 and turbine $T_3$ stationary. Oil from the pump I (rotated at suitable speed) exerts torque on $T_1$ to drive the rear input sun gear 35 forward. Since the rear carrier 42 is momentarily held stationary, the rear pinions 46 attempt to drive the rear reaction ring gear 58 backward. This is prevented by friction torque establishing device 72 and the two one-way clutches 70—68—66 and 65—64—62. Consequently, ring gear 58 acts as a reaction gear and the pinions 46, driven by sun gear 35, walk around inside the ring gear to rotate the carrier 42 and output shaft 16 forward slower than the sun gear, thus multiplying the torque supplied by the turbine $T_1$. This motion also positively drives the turbine $T_3$ forward, regardless of the hydraulic conditions in the torque converter. It will be observed that $T_1$ while exerting its positive drive, necessarily runs faster than output shaft 16 by an amount represented by the ratio of the rear planetary gear set.

In addition, oil flowing from $T_1$ to $T_2$ exerts torque on $T_2$, which through shaft 36 drives the front ring gear 37 forward, tending to rotate the front pinions 44 forward and, when ring 37 rotates fast enough, tending to rotate the front sun reaction gear backward. This is prevented by the rear one-way clutch 70—68—66, which has previously been locked by the rear reaction ring gear 58. Consequently, the front ring gear 37 adds the torque of $T_2$, multiplied by the ratio of the front planetary unit to the transmission output shaft 16 by walking the front pinions around the front reaction sun gear 60, driving carrier 40 forward at reduced speed equal to the ratio of the front planetary gear set.

On starting the car, and below some definite speed depending on the design of the blades of the torque converter, the third turbine $T_3$ does not exert any positive or forward torque derived from hydraulic action but, as previously stated, it is positively driven by the carriers. However, at some definite speed ratio of input shaft to output shaft, positive hydraulic torque is impressed on $T_3$ and its speed due to hydraulic action tends to exceed the speed of the carriers driven by the other turbines. At this point $T_3$ assists in driving the car by torque exerted on the main drive shaft 39—16.

As the speed of the car progressively increases from stand-still two things happen successively. First, the torque delivered to the output shaft by $T_1$ through the rear planetary unit drops to a vanishing point as $T_1$ reaches its terminal speed. When the speed of $T_1$, multiplied by the ratio of the rear planetary unit becomes less than the speed of $T_2$ multiplied by the ratio of the front planetary unit, the second turbine $T_2$ is driving the carriers faster than $T_1$ can drive them and the front freewheeler 65—64—62 breaks away, the rear reaction ring gear 58 rotates forward and $T_1$ idles in the oil stream. $T_2$ is now driving the car, assisted by $T_3$. Second, upon further increase in the speed of the car, $T_2$ reaches its terminal speed and can no longer drive the carriers through the front planetary as fast as $T_3$ which is directly connected to them. At this point the rear free-wheeler 70—68—66 breaks away, the sun gear 60 turns forward, and $T_2$ idles in the stream of the oil.

For reverse drive, forward friction torque establishing device 72 is released and reverse friction torque establishing device 38 is set to hold front ring gear 37 to act as a reaction gear. Incidentally, this holds $T_2$ stationary during all reverse drive. Now $T_1$ drives rear input sun gear 35 forward, which because the carrier 42 is initially held by the stationary car, drives the rear ring gear 58 backward, and through the front one-way clutch 65—64—62 tends to drive the front sun gear 60 backward. This is permitted in fact, for although the outer one-way clutch 70—68—66 tends to lock, its race 70 can turn backward, being unopposed by the friction torque-establishing device 72. Consequently, the front free-wheeler 62—64—65 acts as a drive clutch for the front sun gear 60, which rotating backward walks the front pinions 44 backward around the ring 37, now acting as a reaction gear, and the carrier 40 is rotated slowly backward, driving the car backward and carrying the turbine $T_3$ positively backward. In fact, it is possible, depending on blade design, for the turbine $T_3$ to have reverse torque impressed on it hydraulically, in which case it will assist in driving the car backward. The turbine $T_2$, being held stationary in reverse drive, can act as a guide wheel or reaction member, directing oil from $T_1$ to the front sides of the $T_3$ blades, causing them to tend to drive the carriers backward.

In order to provide different values of torque multiplication for different driving conditions I make the angles of the reaction blades 30 adjustable. The stator is mounted on a suitable rotatable support 86, having any known one-way clutch represented by ratchet members 88 secured to the support 86 and overlapping a stationary tube 90 so as to permit forward rotation but prevent backward rotation, as is known.

*Structural arrangement*

Referring to Fig. 2, the engine shaft 10 is bolted to a flywheel 100 which is bolted to a torque converter casing including an outer shell 102 and a front cover 104. The shell 102 includes one member of the clutch 11 by which the impeller including the blades 20 can be connected to the engine shaft. The first turbine $T_1$ is connected to the innermost shaft 34 which drives the rear sun gear 35. The third turbine $T_3$ is connected to the hollow shaft 39 surrounding the shaft 34 and splined at its right-hand end to the carriers 42 and 44 of the planetary gear sets, the carrier 44 being splined to a flange 105 integral with the output shaft 16. The second turbine $T_2$ is splined to the hollow shaft 36 surrounding the shaft 39 and splined at its right-hand end to a flange 106 integral with the ring gear 37 and provided with external splines 108 by which the shaft 36 and ring gear 37 are connected to the cone 38, which is diagrammatically shown in Fig. 1. To hold the ring gear 37 fast, the cone 38 may be held fast to the casing when gripped between a stationary cone 110 and a non-rotatable but slidable cone 112 formed on a piston 114 forming with a cylinder 116 the pressure chamber 38A, which is the servo 38A in Fig. 1. Fluid under pressure is admitted from any suitable control apparatus (not shown) to the chamber 38A to urge the piston 114 to the right against the force of a return spring 118 which disengages the cones when the chamber 38A is vented.

The general arrangement and particular structure of the apparatus so far described with the exception of the one-way clutches 62—64—65 and 66—68—70 do not form any part of the present invention but are disclosed with greater particularity in the application of Oliver K. Kelley for United States patent filed in the United States Patent Office as Ser. No. 598,370 on July 17, 1956. The disclosure of that application is included herein by reference.

The ring gear 58 is formed on the drum 61 schematically represented in Fig. 1 which drum is integral with or is splined to a radial flange 130 which is integral with or rigidly secured to a tubular shaft 132 which is supported for rotation by bearing sleeves 134 on the output shaft 16. The outer race 62 of the first or left-hand one-way clutch 62—64—65 is rigidly secured to the flange 130, for example, by rivets 136. The first freewheeler has any suitable sprags or rollers 64, which are the unidirectional torque-establishing means 64 of Fig. 1, bearing on the inner race 65 which is a cylinder turning on bearing sleeves 137 on the tubular shaft 132. The race 65 is formed integral with or secured to a radial flange 138 which is rigidly secured as by rivets 140 to the outer race 66 of the second free wheeler. The inner race 70 of the second free-wheeler is mounted on a bearing sleeve 142 on the tubular shaft 132. Between the inner race 70 and the outer race 66 are the unidirectional torque-establishing means 68, diagrammatically illustrated in Fig. 1, which in actual structure are any suitable sprags or rollers. A stop 144 confines the inner races 66 and 70 side by side on the sleeve 132 and against the flange 130. The members 64 are axially confined between the flanges 130 and 138. The members 68 are axially confined between the flange 138 and a stop 146 secured to the inner race 70. The inner race 70 has projections 148 by which it is splined to a drum 150 which is diagrammatically illustrated in Fig. 1 and to which is connected the brake 72 of Fig. 1. The flange 138 is splined to the drum 76 which is splined to the sun gear 60 so that the sun gear, inner race 65 and outer race 66 are all connected rotationally.

Figure 5:
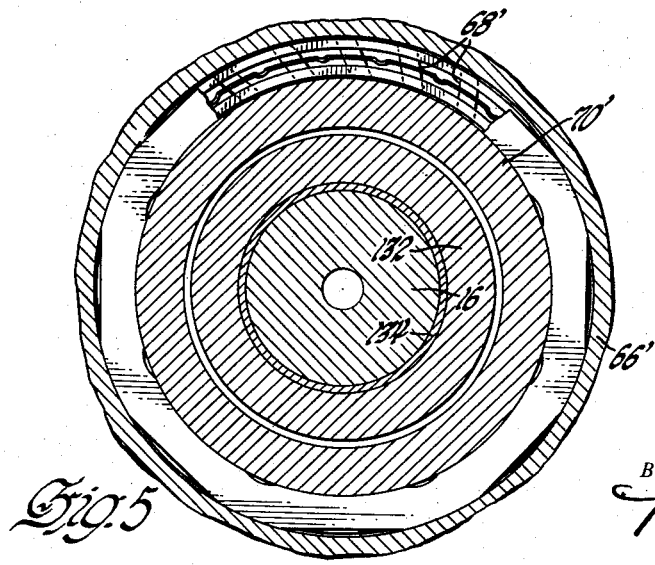
Fig. 5 is a section on the line 5—5 of Fig. 4.
Figure 6:
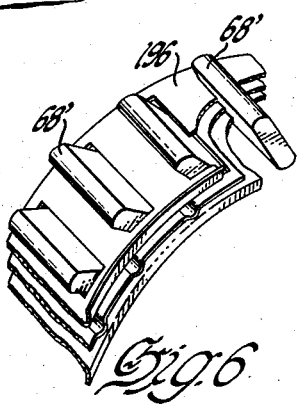
Fig. 6 is a fragmentary perspective view of a portion of an overrunning clutch shown in Figs. 4 and 5.

The structure described above is very economical to manufacture and convenient to assemble and to take apart. By removing the stop 144 which conveniently may be a snap ring, or be held by one, the entire freewheeler structure including the ring gear 58, drum 61, flange 130, shaft 132 and the races and members supported by the shaft 132 can be slid to the right and removed from the shaft 16 and drum 76 as a unit. Both freewheelers can be slid to the right from the shaft 132 as a unit which includes the ring gear 58 which is integral with the flange 130. This provides access to the members 64. The inner race 70 may be slid to the right from the outer race 66 (which remains riveted to the flange 138) affording access to the ratchet members 68. The construction and arrangement of the parts described provides for accurate centering of the races with respect to the one-way elements and does this with a minimum of structure. Everything is supported for rotation on the bearings 134 on the output shaft. Rigid radial support of the inner races 65 and 70 is established by the bearings 134, shaft 132 and bearings 137 and 142. Rigid radial support of the outer race 62 is established by the flange 130. Rigid radial support of the outer race 66 is established by the flange 138. Consequently the outer races are accurately and positively centered with respect to the inner races and this promotes effective operation of the one-way devices which is particularly important where the ratchet members are sprags, as in the modification of Figs. 4 to 6, which will be described.

The freewheelers themselves in Fig. 2 are identical in construction and may be of the cam and roller type shown in Fig. 3. For example, the inner race 70 is a true circular cylinder. The outer race 66 may be provided with the customary separators 162 between which the rollers 68 are mounted engaging the usual cam surfaces 164. The rollers may be urged toward the low ends of the cam surfaces 164 by energizing springs 166. The freewheeler may be lubricated by oil supplied from a bore 168 in the shaft 16 through ducts 170 in the shaft 132 and ducts 172 in the inner races.

In Fig. 4 the outer race 62' of the first freewheeler is formed integral with the drum 61' and the ring gear 58' and this composite integral structure is secured to the flange 130' by pins 136'. The flange 130' is formed integral with the tubular shaft 132' and is axially supported from the flange 105 on the output shaft 16 by a thrust bearing washer 180. The tubular shaft 132' is mounted on the bearings 134 on the output shaft 16 and it in turn supports the bearing sleeves 137 and 142 which support the inner races 65' and 70'. The inner race 65' is formed integral with the flange 138' and the outer race 66' and this composite integral structure is provided with splines 182 by which it is splined or keyed to the drum 76 which connects it to the front sun gear 60. The inner race 70' of the second freewheeler is provided with a flange 184 which is axially supported between a collar 186 on the shaft 16 and a thrust bearing washer 188 disposed in a recess in the end of the shaft 132'. The members 68' are confined between the flange 138' and a stop which may be a snap ring 146' in the outer race 66' which is confined axially as before between the flange 130' and the race 70' which is held by the collar 186. A thrust washer 192 may be placed between the inner races 65' and 70'. The structure may be lubricated by oil obtained from the duct 168' in the shaft 16 and delivered to the moving parts by the duct 172' in the shaft 132' and the ducts 194 in the inner races 66' and 70'. The freewheelers 66'—68'—70' and 62'—64'—65' may be identical. The inner races have true circular cylindrical surfaces and the outer races 62' and 66' have true cylindrical inner surfaces. The one-way elements may be sprags 68' of any known form held in position by any suitable cage construction 196.

I claim:

1. A transmission comprising in combination a shaft supported for rotation in the transmission, an outer race of a one-way clutch radially spaced from the shaft and rigidly secured to the shaft, an inner race of the one-way clutch rotatably supported on the shaft independently of the outer race, uni-directional torque establishing means between said races, a second inner race of a second one-way clutch rotatably supported on the shaft, a second outer race of the second one-way clutch spaced from the second inner race and rigidly secured to the first inner race, ratchet members between the second inner and outer races and means for selectively permitting or preventing rotation of the second inner race.

2. A transmission comprising in combination, a shaft supported for rotation in the transmission, an outer race of a one-way clutch radially spaced from the shaft and rigidly secured to the shaft, an inner race of the one-way clutch rotatably supported on the shaft, uni-directional torque-establishing means between said races, a second inner race of a second one-way clutch rotatably supported on the shaft, a second outer race of the second one-way clutch spaced from the second inner race and rigidly secured to the first inner race, uni-directional torque-establishing means between the second inner and outer races, means for selectively permitting or preventing rotation of the second inner race, and means for positively rotating the first outer race in the sense to lock the first over-running clutch when the second inner race is permitted to rotate.

3. A transmission comprising in combination, a shaft supported for rotation in the transmission, an outer race of a one-way clutch radially spaced from the shaft and rigidly secured to the shaft, a reaction gear keyed to the shaft, and inner race of the one-way clutch rotatably supported on the shaft, uni-directional torque-establishing means between said races, a second inner race of a second one-way clutch rotatably supported on the shaft, a second outer race of the second one-way clutch spaced from the second inner race and rigidly secured to the first inner race, a second reaction gear keyed to the second outer race, uni-directional torque-establishing means between the second inner and outer races, means for selectively permitting rotation of the second inner race or holding the second inner race to prevent rotation in one sense of all of said races, and means operable when the second inner race is permitted to rotate for positively rotating the first reaction gear in the opposite sense to drive the second reaction gear in said opposite sense of rotation.

4. A transmission comprising in combination a first planetary gearset including a sun gear, a ring gear and planetary gears mounted on a carrier, the carrier being adapted to be connected to an output shaft; a second planetary gearset including a ring gear, a sun gear and planetary gears mounted on a carrier connected to the first carrier; means for rotating the first sun gear foward; means for rotating the second ring gear forward; a second shaft supported for rotation about the axis of the planetary gearsets, an outer race of a one-way clutch, said race being concentric with the second shaft, radially spaced therefrom, rigidly connected to the second shaft and keyed to the first ring gear; an inner race of the one-way clutch rotatably supported on the second shaft, uni-directional torque-establishing means between said races, a second inner race of a second one-way clutch rotatably supported on the second shaft, a second outer race of the second one-way clutch spaced from the second inner race, the second outer race being rigidly secured to the first inner race and keyed to the second sun gear; uni-directional torque-establishing means between the second races and means for selectively permitting rotation of the second inner race or preventing rotation of the second inner race to prevent rotation in one sense of the first ring gear and second sun gear.

5. A transmission comprising in combination a first planetary gear-set including a sun gear, a ring gear and planetary gears mounted on a carrier, the carrier being adapted to be connected to an output shaft; a second planetary gearset including a ring gear, a sun gear and planetary gears mounted on a carrier connected to the first carrier; means for rotating the first sun gear forward; means for rotating the second ring gear forward; a second shaft supported for rotation about the axis of the planetary gearsets, an outer race of a one-way clutch, said race being concentric with the second shaft, radially spaced therefrom, rigidly connected to the second shaft and keyed to the first ring gear; an inner race of the one-way clutch rotatably supported on the second shaft, unidirectional torque-establishing means between said races, a second inner race of a second one-way clutch rotatably supported on the second shaft, a second outer race of the second one-way clutch spaced from the second inner race, the second outer race being rigidly secured to the first inner race and keyed to the second sun gear; uni-directional torque-establishing means between the second races and means for selectively permitting rotation of the second inner race or preventing rotation of the second inner race to prevent rotation in one sense of the first ring gear and second sun gear, the first ring gear being adapted when rotated forward with the second inner race being permitted to rotate, to rotate the second ring gear backward.

6. A transmission comprising in combination, a shaft supported for rotation in the transmission, an outer race of a one-way clutch radially spaced from the shaft and rigidly secured to the shaft, an inner race of the one-way clutch rotatably supported on the shaft, uni-directional torque-establishing means between said races, a second inner race of a second one-way clutch rotatably supported on the shaft, a second outer race of the second one-way clutch spaced from the second inner race and integral with the first inner race, uni-directional torque-establishing means between the second inner and outer races and means for selectively permitting or preventing rotation of the second inner race.

7. A transmission comprising in combination, a shaft supported for rotation in the transmission, a radial flange rigidly secured to the shaft, an outer race of a one-way clutch radially spaced from the shaft and rigidly secured to the flange, an inner race of the one-way clutch rotatably supported on the shaft, a radial flange rigidly secured to the inner race, uni-directional torque-establishing means between said races, a second inner race of a second one-way clutch rotatably supported on the shaft, a second outer race of the second one-way clutch spaced from the second inner race and rigidly secured to the flange of the first inner race, uni-directional torque-establishing means between the second inner and outer races and means for selectively permitting or preventing rotation of the second inner race.

8. A transmission comprising in combination a shaft supported for rotation in the transmission, an outer race of a one-way clutch radially spaced from the shaft and rigidly secured to the shaft, radial bearing means surrounding the shaft, an inner race of the one-way clutch rotatably supported on the bearing means, uni-directional torque-establishing means between said races, a second inner race of a second one-way clutch rotatably supported on the bearing means, a second outer race of the second one-way clutch spaced from the second inner race and rigidly secured to the first inner race, uni-directional torque-establishing means between the second inner and outer races and means for selectively permitting or preventing rotation of the second inner race.

9. A transmission comprising in combination a shaft supported for rotation in the transmission, a radial flange secured to one end of the shaft, an outer race of a one-way clutch rigidly secured to the flange and radially spaced from the shaft, an inner race of the one-way clutch rotatably supported on the shaft adjacent the flange, uni-directional torque-establishing means between the races, a second inner race of a second one-way clutch rotatably supported on the shaft beside the first inner race, a stop holding the inner races axially between the flange and the stop, a second flange secured to the inner race and projecting radially outward adjacent the first outer race, a second outer race of a second one-way clutch secured to the second flange, uni-directional torque-establishing means between the second inner and outer races, a second stop holding the second uni-directional torque-establishing means axially between the second flange and the second stop, and means selectively permitting or preventing rotation of the second inner race.

References Cited in the file of this patent

UNITED STATES PATENTS

| | | |
|---|---|---|
| 2,628,510 | McRae | Feb. 17, 1953 |
| 2,645,137 | Roche | July 14, 1953 |